Jan. 22, 1957

H. C. BERRY 2,778,142

TROT-LINE ROD

Filed May 16, 1955

H. C. Berry
INVENTOR

BY C. A. Snow & Co.
ATTORNEYS.

Jan. 22, 1957　　　H. C. BERRY　　　2,778,142
TROT-LINE ROD
Filed May 16, 1955　　　　　　　　　2 Sheets-Sheet 2
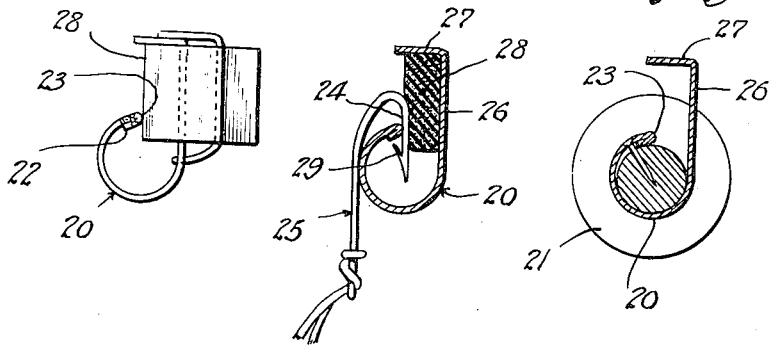
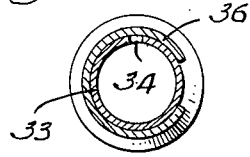
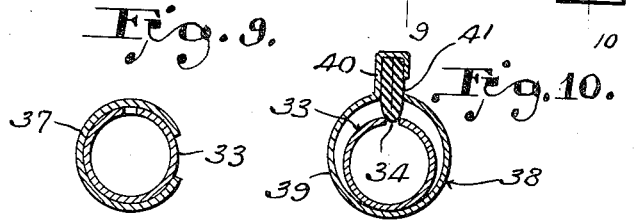
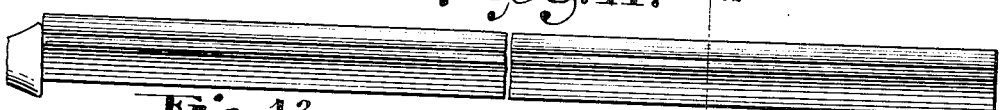
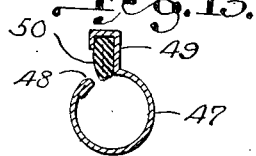
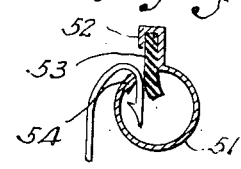
H. C. Berry
INVENTOR
BY Cashnow & Co.
ATTORNEYS.

United States Patent Office 2,778,142
Patented Jan. 22, 1957

2,778,142
TROT-LINE ROD
Harry Chester Berry, Little Rock, Ark.

Application May 16, 1955, Serial No. 508,538

2 Claims. (Cl. 43—27.4)

This invention relates to a trot-line rod or holder.

An object of the invention is to provide a trot-line rod or holder which is adapted to frictionally hold a series of fish hooks in a position whereby the fish line and the leaders will not become snagged or tangled and the hooks may be easily removed in consecutive order by a pull on the leading end of the fish line.

Another object of this invention is to provide a trot-line rod or holder wherein a rubber strip or friction member is carried by the tubular support against which the fish hook is adapted to bear so that the hook will be frictionally held against shifting.

A further object of this invention is to provide a trot-line rod or holder which is simple in construction and can be made of various lengths and sizes for holding different type and sizes of fish hooks.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 3 is a front elevation of the device.

Fig. 4 is a sectional view taken on line 4—4 of Fig. 2.

Fig. 5 is a sectional view taken on line 5—5 of Fig. 2.

Fig. 6 is a detail side elevation partly broken away of a modified form of this invention.

Fig. 7 is a plan view of the device shown in Fig. 6.

Fig. 8 is a sectional view taken on line 8—8 of Fig. 7.

Fig. 9 is a sectional view taken on line 9—9 of Fig. 7.

Fig. 10 is a sectional view taken on line 10—10 of Fig. 7.

Fig. 11 is a plan view partly broken away of another modification of this invention.

Fig. 12 is a sectional view of an enlarged section taken on line 12—12 of Fig. 11.

Fig. 13 is a transverse sectional view of another modified form of this invention.

Fig. 14 is a transverse sectional view of a further modification of this invention.

Fig. 15 is a transverse sectional view of a further modification of this invention.

Figure 1:
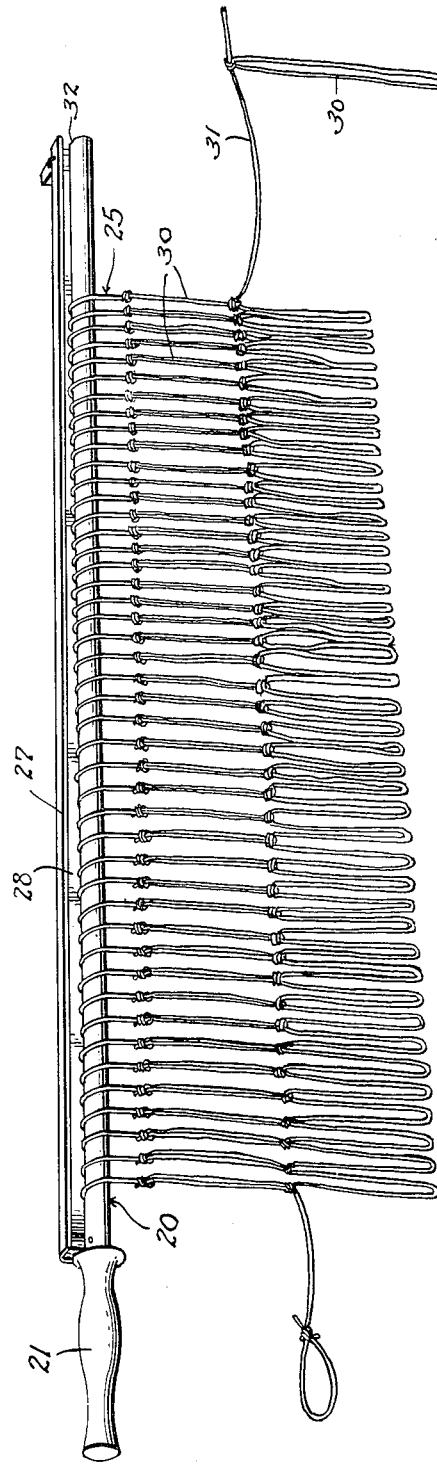
Figure 1 is a perspective view of a trot-line rod or holder constructed in accordance with an embodiment of this invention showing a series of fish hooks mounted on the device.
Figure 2:
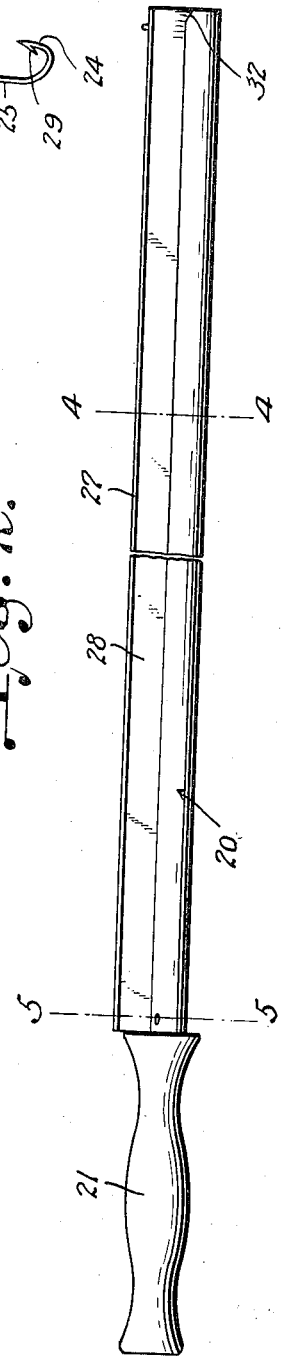
Fig. 2 is a detail side elevation of the device.

Referring to the drawings, and first to Figs. 1 to 5, inclusive, the numeral 20 indicates generally an elongated tubular member which has a handle 21 at one end thereof. The tubular member 20 is of partly cylindrical configuration and has one edge thereof turned inwardly, as indicated at 22 so as to produce a rounded edge 23 adapted to engage a bill 24 of a fish hook 25. The tubular member 20 is provided with an elongated straight wall 26 formed with an outer right-angular flange 27. An elongated flat rubber strip 28 is adhesively or otherwise secured to the inside face of wall 26 and flange 27 and projects partly into the tubular member 20, as shown in Fig. 4, so as to yieldably bear against the rounded edge 23. When the fish hook 25 is in a flat position with respect to the tubular member 20, the barb 29 of the fish hook 25 will be disposed within the tubular member 20 and the bill 24 will frictionally bear against the confronting surface of the rubber strip 28 and will also bear against the rounded edge 23 of tubular member 20. Each hook 25 is connected with one end of a leader 30 and the leader 30 is connected to an elongated fish line 31. When the fish hooks 25 are disposed within the tubular member 20 the leaders 30 will be disposed in vertical depending position, as shown in Fig. 1, with the line 31 depending from the leaders 30 and forming loops so that the line 31 with the leaders 30 will quickly dry in the event the device is supported from a suitable support. The front end of the tubular member 20 is cut off on a bevel, as indicated at 32 so as to provide an entrance mouth to facilitate the easy mounting of the fish hooks 25 on the tubular member 20.

Referring now to Figs. 6 to 10, inclusive, which discloses another modification of this invention embodying a tubular member 33 which is formed with a longitudinal slot 34 terminating forwardly of the rear end of tubular member 33 and opening through the forward end of tubular member 33. A handle 35 is secured to the inner or rear end of tubular member 33. A pair of split hook locking rings 36 and 37 are disposed about tubular member 33 and are adapted to be disposed in spaced-apart relation so as to engage therebetween a series of fish hooks which have the bills thereof extended through the slot 34. In this manner a series of fish hooks may be relatively tightly engaged with each other and with the bills of the hooks projecting through the opening or slot 34 and the shanks of the hooks extending in depending position at right angles to the length of tubular member 33. The forward or leading end of tubular member 33 has a cap member generally indicated at 38 removably mounted thereon. This cap member 38 is formed of a split tubular member 39 which is formed with an integral U-shaped clip or channel member 40 extending lengthwise thereof. A rubber friction member 41 is clamped on the clip 40 and the inner edge of rubber strip 41 frictionally bears against the slot or opening 34, as shown in Fig. 10. It will be understood that there may be a series of these split rings 36 and 37 mounted on the tubular member 33 so that different sizes or types of fish hooks may be separated one from the other and different fish lines may be engaged with a single holder.

Referring now to Figs. 11 and 12, there is disclosed another modification of this invention embodying an elongated split tubular member 42, which is provided with a reverted edge 43 engageable with the bills of the fish hooks. The tubular member 42 also includes a channel-shaped clip 44 within which a rubber tube 45 is tightly clamped, so that the projecting portion 46 of the rubber tube 45 will bear against the reverted edge 43.

Referring now to Fig. 13, there is disclosed another modification of this invention, wherein a longitudinally split tubular member or holder 47 is formed with a rounded edge 48 and a channel-shaped holder 49 extends from and is formed integral with the tubular member 47. A folded rubber friction member 50 is tightly gripped in the clip 49 and is disposed closely adjacent the edge 48 so that when the bill of a fish hook is extended into the tubular member 47 the bill will frictionally bear against the rubber member 50.

Referring now to Fig. 14, there is disclosed a further modification of this invention embodying an elongated tubular member 51 having a channel-shaped clip 52 extending therefrom. A flat rubber friction member 53 is tightly gripped in the clip 52 and extends partly into the interior of the tubular member 51 so as to thereby frictionally bind the bill of the fish hook against the adjacent reverted edge 54 of tubular member 51.

Referring now to Fig. 15 as disclosing a further embodiment of this invention, this figure involves a longitudinally split tubular member 55. A rubber strip holder or clip 57 projects from the tubular member 55 and is formed with an arcuate base flange 58 secured as by welding or fastening means 59, to the exterior of the tubular member 55. The clip 57 has a rubber friction member 60 tightly gripped therein which confronts rounded edge 56 and projects partly into tubular member 55.

In the use of this device, the fish hooks having leaders 30 secured to line 31 are inserted on the tubular member 20 from the forward end and are then moved along the tubular member 20 until the fish hooks lie closely adjacent the handle 21. When all of the hooks are engaged with the tubular member 20 and are frictionally engaged with the rubber strip 28 the device may be disposed in a horizontal position so that the leaders and fish line will be free and air may freely circulate therethrough. In this manner the fish lines with the leaders will quickly dry out.

The fish lines with hooks attached thereto may be easily and quickly removed from the holder by anchoring the forward end of the line 31 and then pulling the line 31 forwardly. The fish hooks 25 will slide along the tubular member 20 and the leaders 30 with the hooks 25 will not become tangled with adjacent hooks and leaders in view of the frictional resistance against movement of the hooks occasioned by the rubber strip 28.

What is claimed is:

1. A trot-line rod comprising an elongated partly cylindrical tubular member, a handle fixed to one end of said member, one edge of said member being reverted to provide a rounded hook engaging edge, a rubber friction member projecting partly into said member and confronting said rounded edge, and means supporting said rubber member.

2. A trot-line rod comprising an elongated partly cylindrical tubular member, a handle fixed to one end of said member, an inverted L-shaped member extending from one edge of said member, and a rubber friction member fixed to said L-shaped member and confronting the other edge of said member.

References Cited in the file of this patent
UNITED STATES PATENTS

| | | |
|---|---|---|
| 2,555,397 | Coward | June 5, 1951 |
| 2,633,661 | Stevens | Apr. 7, 1953 |